United States Patent
Egerer et al.

(10) Patent No.: US 8,016,465 B2
(45) Date of Patent: Sep. 13, 2011

(54) LUMINOUS MOLDED PART, IN PARTICULAR A DECORATIVE PART AND/OR TRIM PART FOR A VEHICLE INTERIOR

(75) Inventors: Gerhard Egerer, Trabitz (DE); Michael Wagner, Breitengüssbach (DE); Andreas Abach, Nürnberg (DE)

(73) Assignee: Novem Car Interior Design GmbH, Vorbach (DE)

( * ) Notice: Subject to any disclaimer, the term of this patent is extended or adjusted under 35 U.S.C. 154(b) by 58 days.

(21) Appl. No.: 12/266,365

(22) Filed: Nov. 6, 2008

(65) Prior Publication Data

US 2009/0129107 A1  May 21, 2009

(30) Foreign Application Priority Data

Nov. 15, 2007 (EP) .................................. 07022185

(51) Int. Cl.
*F21V 9/16* (2006.01)
*B60Q 1/26* (2006.01)
(52) U.S. Cl. .................. 362/489; 362/510; 362/23
(58) Field of Classification Search .................. 362/509, 362/545, 236, 84, 488, 489, 23, 231, 510
See application file for complete search history.

(56) References Cited

U.S. PATENT DOCUMENTS

| | | | |
|---|---|---|---|
| 5,997,161 A * | 12/1999 | Stringfellow et al. | 362/489 |
| 6,883,926 B2 * | 4/2005 | Wojnarowski | 362/84 |
| 7,052,152 B2 * | 5/2006 | Harbers et al. | 362/30 |
| 7,276,854 B1 | 10/2007 | Deutsch et al. | |
| 7,316,494 B2 * | 1/2008 | Eichhorn et al. | 362/545 |
| 7,431,484 B2 * | 10/2008 | Fong | 362/489 |
| 2003/0081411 A1 | 5/2003 | Noda et al. | |
| 2006/0087826 A1 * | 4/2006 | Anderson | 362/23 |
| 2007/0240346 A1 * | 10/2007 | Li et al. | 40/544 |
| 2009/0219730 A1 * | 9/2009 | Syfert et al. | 362/489 |

FOREIGN PATENT DOCUMENTS

| | | |
|---|---|---|
| DE | 10248897 A1 | 8/2003 |
| EP | 0072963 A2 | 3/1983 |
| EP | 1705626 A1 | 9/2006 |
| FR | 2054877 A | 5/1971 |
| WO | WO2007/103394 A2 | 9/2007 |

* cited by examiner

*Primary Examiner* — Jong-Suk (James) Lee
*Assistant Examiner* — Peggy A. Neils
(74) *Attorney, Agent, or Firm* — Workman Nydegger

(57) ABSTRACT

The invention relates to a molded part, in particular a decorative part and/or a trim part for a vehicle interior. According to the invention, the molded part comprises at least one excitation source for emitting electromagnetic waves and at least one luminescent material which is excitable or excited by the electromagnetic waves emerging from the excitation source or sources to emit light in the visible range.

15 Claims, 6 Drawing Sheets

LUMINOUS MOLDED PART, IN PARTICULAR A DECORATIVE PART AND/OR TRIM PART FOR A VEHICLE INTERIOR

CROSS-REFERENCE TO RELATED APPLICATIONS

The present invention claims the benefit of priority to European Patent Application No. 07 022 185.8, filed Nov. 15, 2007, entitled "Luminous Molded Part, in Particular a Decorative Part and/or Trim Part for the Vehicle Interior," the entire contents of which are hereby incorporated by reference.

BACKGROUND OF THE INVENTION

1. The Field of the Invention

The invention relates to a molded part, in particular a decorative part and/or a trim part for a vehicle interior.

2. Discussion of the Relevant Art

Molded parts usually comprise a carrier, for example composed of plastic, and a decorative layer. The decorative layer can extend over the entire molded part, but it is likewise possible for said decorative layer only to be assigned to a partial region of the molded part.

In the event of traveling at night, the decorative and trim parts in the vehicle interior appear dark. Only the displays and switching elements on the dashboard or displays and switching elements integrated into the trim and/or decorative parts are illuminated. Although the interior lighting of the vehicle is able to illuminate the trim and/or decorative parts and thus make them visible, this light source is usually switched off during driving since, in darkness, it impedes the driver's view owing to its brightness, in particular in darkness.

The dark vehicle interior surfaces that occur in darkness and the dark vehicle interior overall are often found to be unpleasant by the vehicle occupants. A background brightness in the vehicle interior is desired which makes it possible to discern the decorative features of the molded parts and thus the configuration of the interior without the driver's view being restricted by excessively high brightness and/or dazzling in the event of traveling at night.

BRIEF SUMMARY OF THE INVENTION

It is an object of the invention to specify a molded part, in particular a decorative and/or trim part for a vehicle interior, with which the above-mentioned disadvantages can be overcome. This object is achieved by means of the features of the claims. Advantageous configurations and developments are specified in the dependent claims.

The molded part according to the invention is a molded part which emits light in the visible range under certain preconditions. For this purpose, the molded part comprises at least one excitation source for emitting electromagnetic waves and at least one luminescent material (specifically a photoluminescent material) which is excitable or excited by the electromagnetic waves emerging from the excitation source or sources to emit light in the visible range. This molded part is, in particular, a decorative and/or trim part for a vehicle interior.

The luminescent material can be caused to emit light in a targeted manner by means of the excitation source. In this way, the molded part can be luminous in a predetermined manner, and its decorative effect is shown to advantage even in darkness. These luminous molded parts enable novel trends in vehicle interior design. Hitherto unknown effects and actions can be implemented particularly in the case of night design.

It is particularly advantageous that the molded parts according to the invention can be embodied in such a way that they are luminous areally. Individual bright luminous sources are not necessary. As a result, dazzle effects are avoided, and a uniform background illumination that is free of disturbances and devoid of dazzle for the vehicle occupants can be produced with the molded parts.

The activation of the luminescent material and thus of the illumination by activation of the excitation sources enables the illumination to be controlled in a targeted manner. The vehicle occupants can thus adapt the light emission of the molded parts and thus the interior lighting to their wishes. Overall, the invention therefore opens up totally novel lighting possibilities for the vehicle interior.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention is also explained in more detail below with regard to further features and advantages on the basis of the description of exemplary embodiments and with reference to the accompanying schematic drawings, in which.

DETAILED DESCRIPTION OF THE PREFERRED EMBODIMENTS

Figure 1:
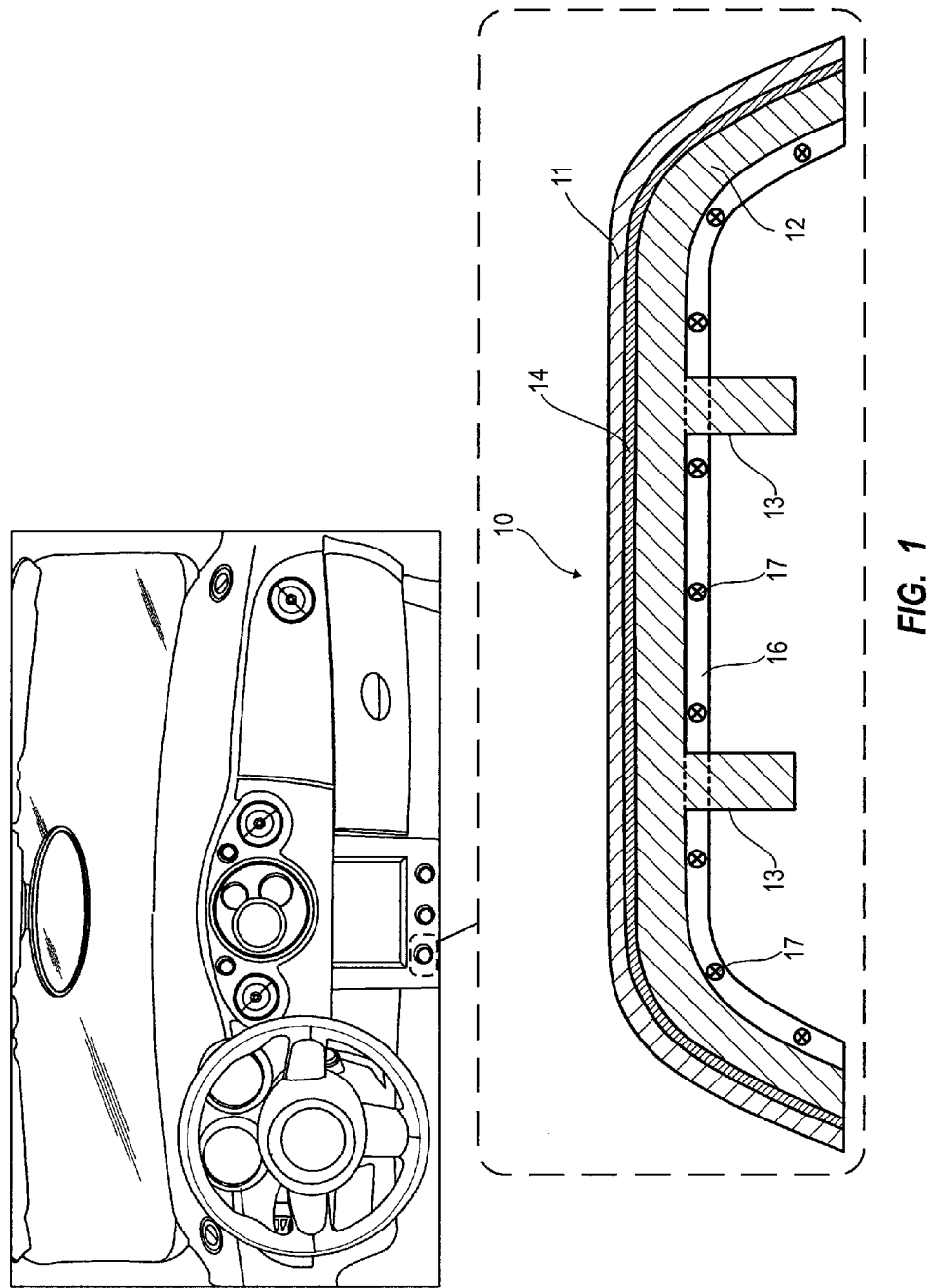
FIG. 1 shows a first exemplary embodiment of a molded part according to the invention in a schematic cross-sectional illustration.

Luminescence is understood to be the phenomenon wherein a luminescent material absorbs an energy and emits it again as electromagnetic radiation. Photoluminescence is the best known type of luminescence, wherein the luminescent material absorbs the energy of the photons of an exciting electromagnetic wave (often that of ultraviolet light) and emits it again as electromagnetic radiation, in particular as visible light (radiation in the visible color spectrum of the light). Luminescence is also referred to as cold light emission since, in contrast to conventional light emission, luminescence does not require any heat.

In principle, a distinction is made between two forms of photoluminescence according to the longevity of the luminescence back-radiation: if the absorbed energy is emitted immediately (emission within $10^{-4}$ s), then this is called fluorescence. If the emission requires longer, this is referred to as phosphorescence. Phosphorescent materials can even have a persistent radiation of up to a number of hours. In other words: fluorescence means: excitation off=light emission off; phosphorescence means: excitation off, persistence without excitation for a certain time, a few minutes or even hours.

In accordance with one development of the invention, the luminescent material is a fluorescent material. This has the advantage of exact controllability by means of the excitation sources. If the excitation sources are active, the luminescent material is luminous. If the excitation sources are switched off, the light emission of the fluorescent material is also extinguished.

However, it can also be provided that the luminescent material is a phosphorescent material. In this case, the persistence after the excitation sources have been switched off can be utilized for specific effects, for example for a slow, to an extent dimmed extinguishing of the light emission. The persistence of the phosphorescent material is temporally limited, usually a few minutes up to hours; it cannot be terminated prematurely. Mixed forms of fluorescent and phosphorescent material are also possible.

Fluorescent materials that are considered for use in the molded parts are for example the dyes uranine, rhodamines, fluorescein, DAPI, coumarins, allophycocyanine, indocyanine green/ICG, quinine hydrogen sulfate, GFP (Green Fluorescent Protein), squaraines (squaric acid dyes) based on N,N-dialkylanilines, and 1,3,2-dioxaborines (complexes of boric acid derivatives with 1,3-dicarbonyl compounds).

Phosphorescent materials that are considered for use in the molded parts are, in particular, crystals with a small admixture of an impurity that disturbs the lattice structure of the crystal, for example sulfides of metals from the second group and also zinc that are admixed with small quantities of heavy metal salts, e.g. zinc sulfide with traces of heavy metal salts. Alkaline earth metal aluminate crystals shall be mentioned as a further example.

Luminescent materials typically occur in minerals. For the application, the luminescent materials can be integrated into specific plastics. In accordance with one embodiment variant, the luminescent materials used in the molded parts can therefore be luminescent minerals and/or luminescent dyes.

One important property of the luminescent materials, to be precise both of the fluorescent materials and of the phosphorescent materials is that the respective luminous phenomenon can be repeated without restriction, that is to say that the materials are not consumed. This ensures usability over the lifetime of a motor vehicle. The luminescent materials do not have to be replaced, renewed or maintained.

In accordance with one preferred development of the invention, the electromagnetic waves emerging from the excitation source are a radiation in the non-visible range, in particular a UV radiation.

A development in which the excitation source is or comprises a UV light source, in particular a UV lamp or a UV-LED or a UV-LED strip or a UV electroluminescent film is particularly expedient.

The excitation source can also be an optical waveguide which distributes the exciting wave emerging from a light source, for example a UV light source, in the carrier.

Preferably, like the known molded parts, the molded part comprises at least one decorative layer and at least one carrier, for example a plastic carrier.

In one embodiment variant of the invention, the excitation source or the excitation sources is or are arranged at and/or in the carrier. They can also be arranged at a distance from the carrier, for example on that side of the carrier which is remote from the decorative layer.

In accordance with one development, the luminescent material is provided at and/or in the carrier. Consequently, the decorative layer is illuminated from the carrier and thus from behind. The light shines through the thin decorative layer, such that the molded part overall is luminous. The decoration thus becomes visible even in darkness. As an alternative or in addition, it is also possible for the luminescent material to be provided at and/or in the decorative layer, in particular at and/or in regions of the decorative layer that are remote from the visible side.

In accordance with one development, the luminescent material is arranged or applied as a layer onto the carrier, for example directly on the carrier (to be precise either on the side facing the decorative layer or on the side remote from the decorative layer, or equally on both sides) or firstly on the rear side of the decorative layer, which is then arranged on the carrier.

As an alternative or in addition, the luminescent material can also be integrated or incorporated into the carrier, in particular be integrated or incorporated into the material that forms the carrier as early as during the formation of the carrier and/or be mixed or blended with the material that forms the carrier. To an extent a blend of normal carrier material and luminescent material is thus present upon integration or incorporation.

In the case of arrangement as a layer on the carrier, the layer can uniformly cover the carrier, such that uniform light emission is brought about upon uniform excitation. However, it is also possible for only partial regions of the carrier to be covered by the layer, such that a structured light emission is brought about. The distribution density of the luminescent material in the layer can also be continuous in order to produce uniform light emission. It is also possible, however, to provide a discontinuous distribution density, that is to say, partial regions having more luminescent pigments and partial regions having fewer luminescent pigments, whereby inhomogeneous, structured light emission is in turn brought about.

It is also the case when the luminescent material is incorporated or integrated into the carrier that the entire carrier can be uniformly provided with the luminescent material, such that uniform light emission is brought about upon uniform excitation. However, the luminescent material can also be integrated or incorporated just into partial regions of the carrier, such that structured light emission is brought about. The distribution density of the luminescent material in the carrier can also be continuous in order to produce uniform light emission. It is also possible, however, to provide a discontinuous distribution density, that is to say partial regions having more luminescent pigments and partial regions having fewer luminescent pigments, whereby inhomogeneous, structured light emission is in turn brought about.

A comparable situation also applies to the arrangement of the excitation sources. The latter can be provided, in principle, at the rear side—remote from the decorative layer—of the carrier (in a manner adjoining the carrier or at a distance from the carrier) and/or in cutouts in the carrier. In principle, they can also be arranged between decorative layer and carrier at the carrier. The distribution of the excitation sources affects the light emission of the luminescent material. A continuous distribution enables light emission of areally uniform intensity. A discontinuous distribution enables correspondingly structured light emission, even in the case of homogeneous distribution of the luminescent material in or at the carrier.

Areally homogeneous light emission or structured light emission can also be brought about by means of the targeted driving of the excitation sources. If the excitation sources emit excitation waves of high intensity, the light emission brought about is also stronger than in the case of excitation waves of low intensity. If the excitation sources (if appropriate also homogeneously distributed excitation sources) are driven and thus activated to different degrees, correspondingly structured light emission of the luminescent material can be brought about.

The carrier is embodied such that it is at least partly transparent or translucent, wholly or at least in sections, to the exciting waves emerging from the excitation source and/or the light that is emitted or to be emitted by the luminescent material. In particular, the carrier can be a plastic that is at least partly transparent or translucent to the exciting waves emerging from the excitation source and/or the light that is emitted or to be emitted by the luminescent material, or comprise a plastic of this type. Preferably a thermoplastic or an elastomer or a thermosetting plastic is involved here.

In accordance with one embodiment variant, dyes are additionally provided at or in the carrier which impart a specific hue to the light that is emitted or to be emitted by the luminescent material in the visible range. These dyes can be incorporated or integrated into the carrier and/or are mixed or blended with the material forming the carrier.

All known decorative layers are considered, in principle, for the decorative layer. By way of example, the decorative layer can comprise a decorative sheet, in particular a wood veneer and/or a metal sheet and/or a film, preferably a plastic and/or metal film, and/or a textile sheet and/or a fabric. The thickness of the decorative layer should be chosen in such a way that the respective luminescence radiation brings about the desired illumination effect, in particular can bring about sufficiently bright light emission from the decoration. The thinner the decorative layer or the decorative sheet, the more intense the decorative light emission that can be generated.

Figure 2:
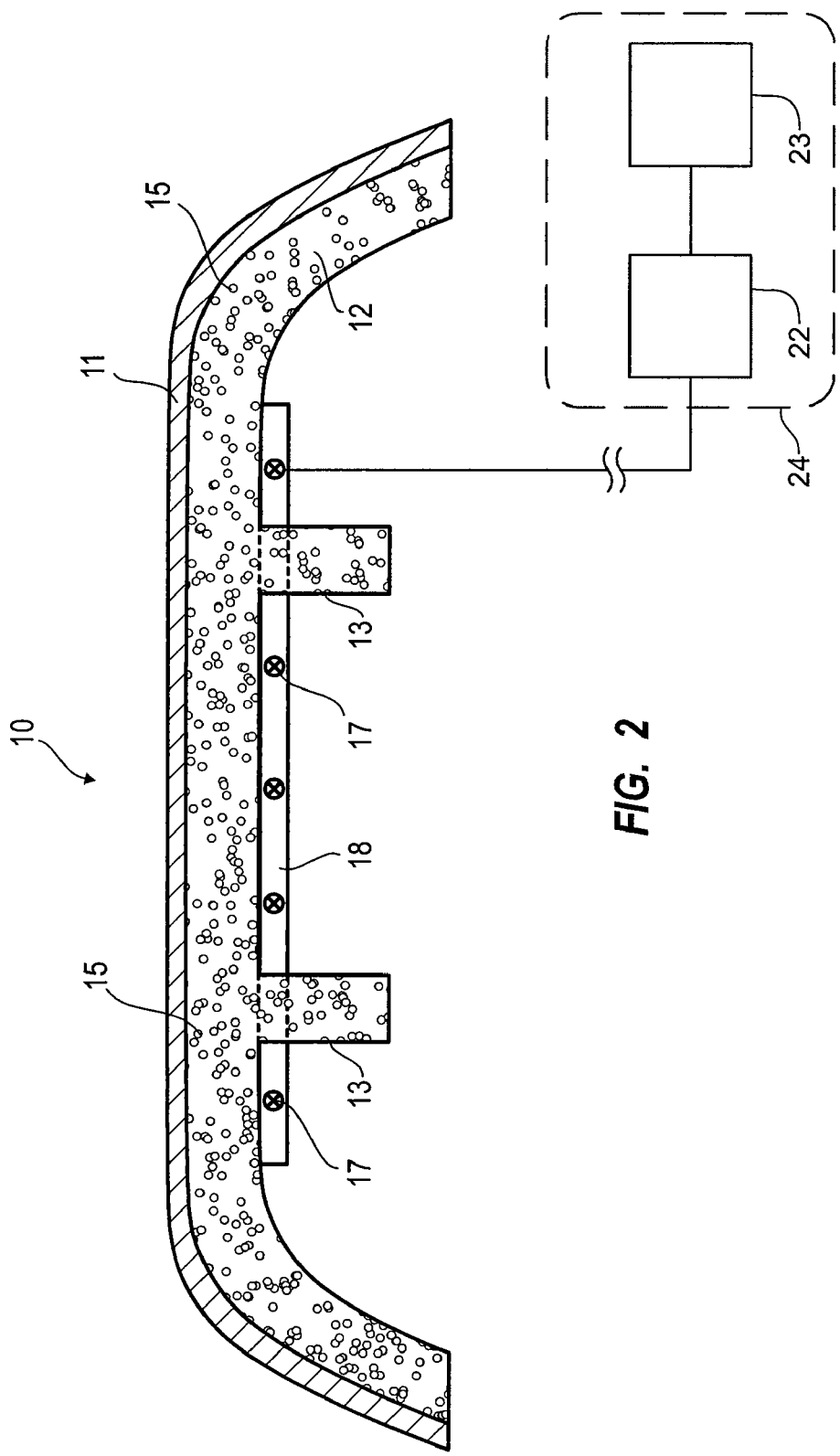
FIG. 2 shows a second exemplary embodiment of a molded part according to the invention in a schematic cross-sectional illustration.

The excitation source, as shown in FIG. 2, can be electrically connected to a control device 22 for electrically driving the excitation source. In particular, it can be connected to the voltage source 23 of the vehicle via the on-board electrical system 24 of the vehicle. The control device 22 can be designed to uniformly activate or deactivate a plurality or all of the excitation sources. It can also be designed to set the intensity of the activation such that the intensity of the light emission brought about from the luminescent material can be set. It is also possible that excitation sources arranged in different regions of the molded part are driven separately from one another; the separate driving of individual excitation sources is also possible. As a result, correspondingly structured luminous effects can be brought about, or the interior lighting can be adapted to individual wishes with regard to its intensity and spatial distribution. It is also possible for specific lighting settings to be stored in the control unit and be called up as required.

FIG. 1 to FIG. 6 each show different exemplary embodiments of a molded part 10 according to the invention in a schematic cross-sectional illustration. Mutually corresponding parts and components are provided with the same reference symbols in the figures.

The molded part 10 in each case comprises a decorative layer 11 at that side of the molded part 10 which is provided as the visible side in an installed state, and a carrier 12 composed of plastic or rigid foam, which forms fixing elements 13 by means of which the molded part 10 can be fitted as a decorative and/or trim part in a vehicle interior.

In the first exemplary embodiment of the molded part 10 in accordance with FIG. 1 a luminescent layer 14 consisting of or comprising luminescent material is provided between decorative layer 11 and carrier 12. A UV-LED strip 16 with UV-LEDs 17 as excitation source is arranged at the opposite side of the carrier 12 to the luminescent layer 14.

In the second exemplary embodiment of the molded part 10 in accordance with FIG. 2, luminescent material 15 is incorporated or integrated into the carrier 12. A UV-LED circuit board 18 with UV-LEDs 17 as excitation source is arranged at the opposite side of the carrier 12 to the decorative layer 11.

Figure 3:
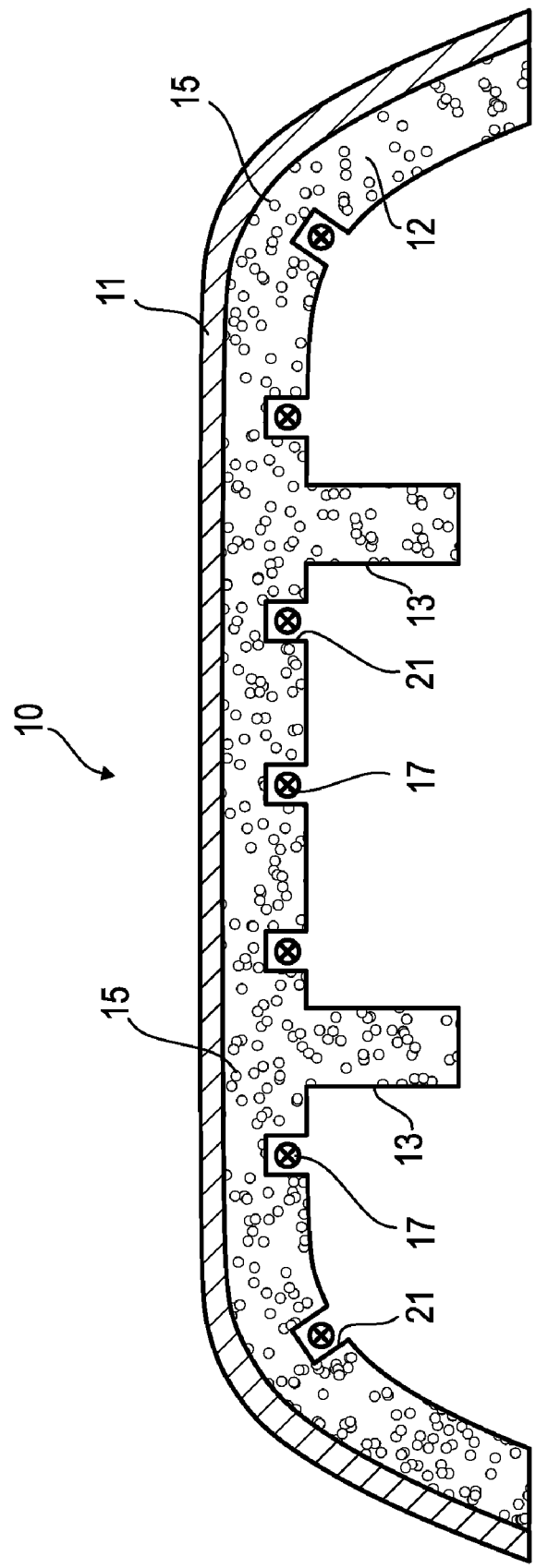
FIG. 3 shows a third exemplary embodiment of a molded part according to the invention in a schematic cross-sectional illustration.

In the third exemplary embodiment of the molded part 10 in accordance with FIG. 3, luminescent material 15 is once again incorporated or integrated into the carrier 12. At the opposite side of the carrier 12 to the decorative layer 11, cutouts 21 are formed in the carrier 12, UV-LEDs 17 being arranged as excitation source in said cutouts. The mechanical fixing and also the electrical driving of the UV-LEDs 17 are not illustrated.

Figure 4:
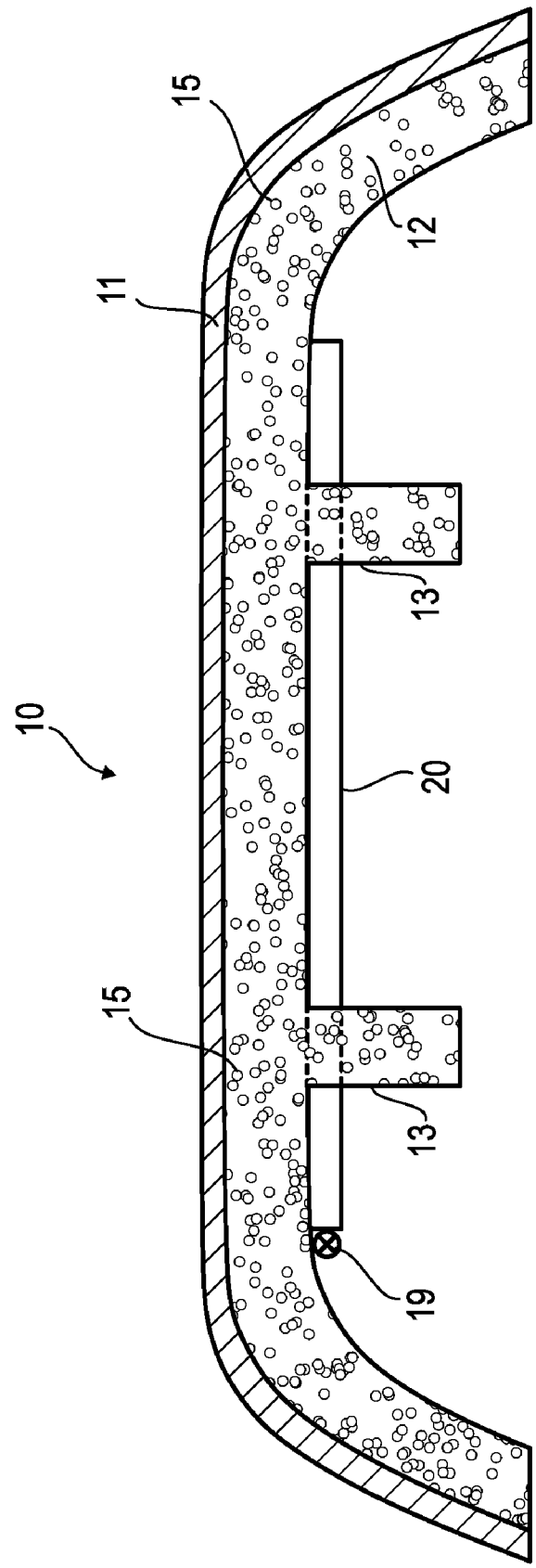
FIG. 4 shows a fourth exemplary embodiment of a molded part according to the invention in a schematic cross-sectional illustration.

In the fourth exemplary embodiment of the molded part 10 in accordance with FIG. 4, luminescent material 15 is once again incorporated or integrated into the carrier 12. An optical waveguide 20 as excitation source is arranged at the opposite side of the carrier 12 to the decorative layer 11. A UV light source 19 as the actual source of the exciting UV waves and as the excitation source is arranged at one end of the optical waveguide 20. The UV radiation of the UV light source 19 is distributed by the optical waveguide 20.

Figure 5:
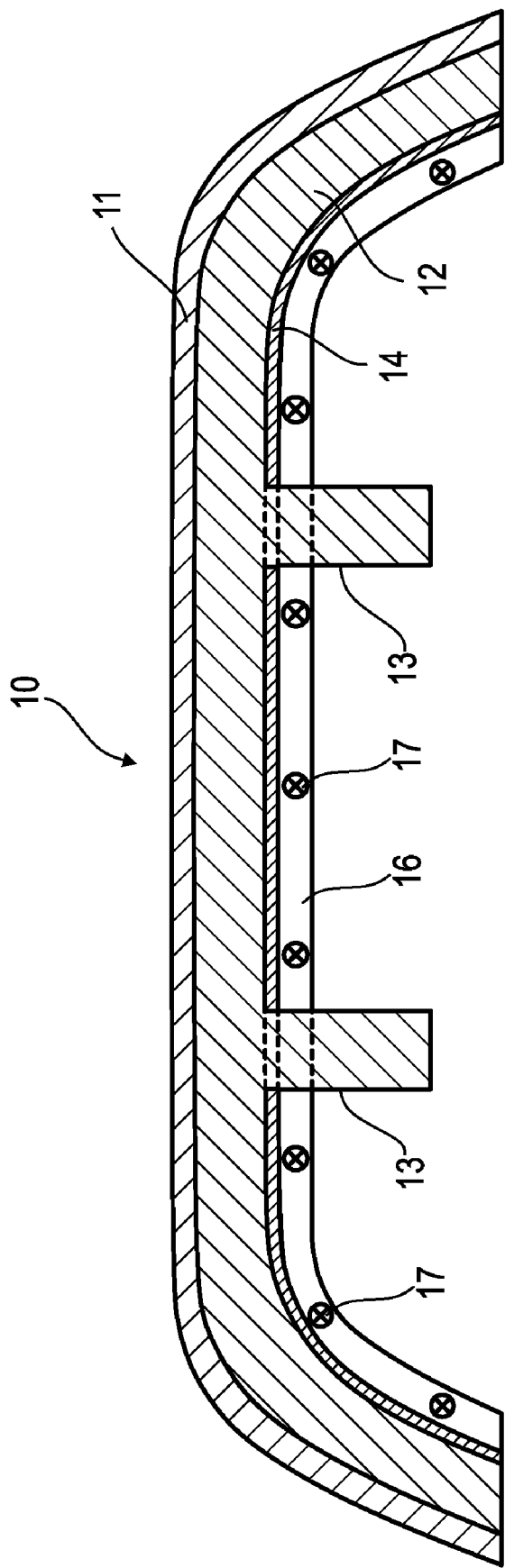
FIG. 5 shows a fifth exemplary embodiment of a molded part according to the invention in a schematic cross-sectional illustration.

In the fifth exemplary embodiment of the molded part 10 in accordance with FIG. 5, a luminescent layer 14 consisting of or comprising luminescent material is provided directly on that side of the carrier 12 which is remote from the decorative layer 11. The luminescent layer 14 is followed directly by a UV-LED strip 16 with UV-LEDs 17 as excitation sources.

Figure 6:
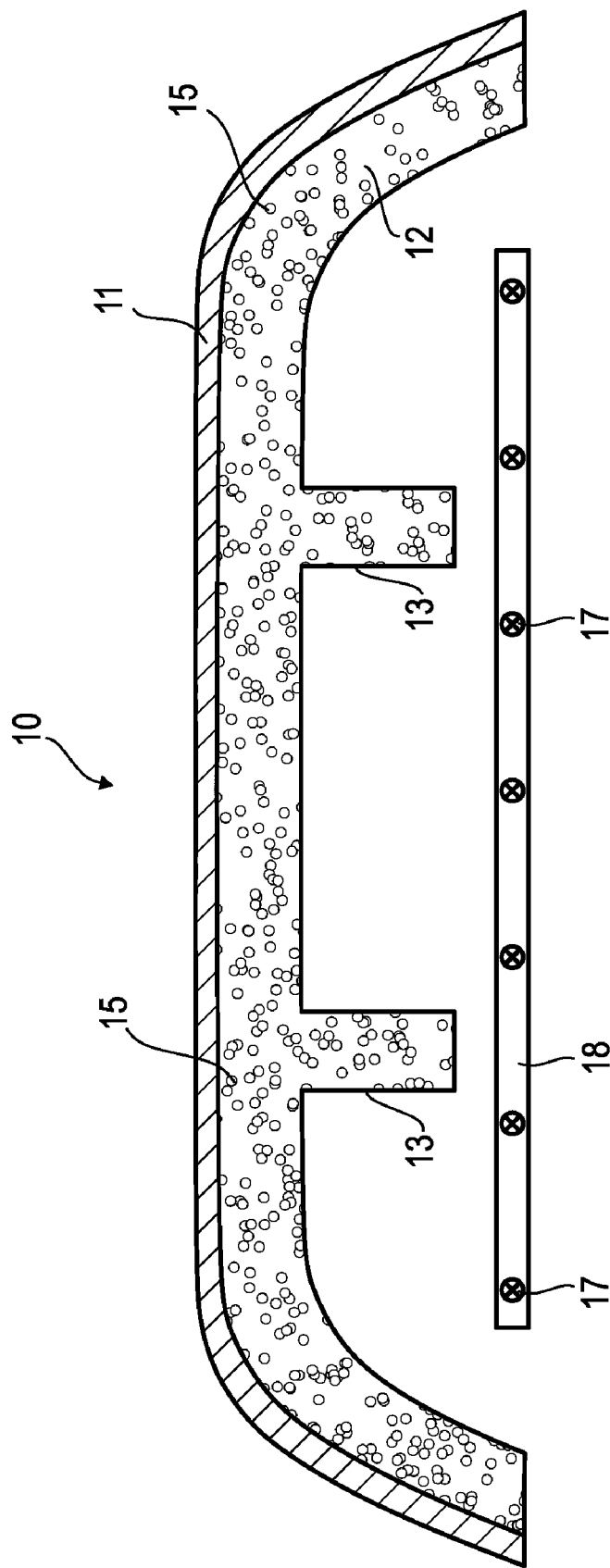
FIG. 6 shows a sixth exemplary embodiment of a molded part according to the invention in a schematic cross-sectional illustration.

In the sixth exemplary embodiment of the molded part 10 in accordance with FIG. 6, luminescent material 15 is incorporated or integrated into the carrier 12, as in the example according to FIG. 2. A UV-LED circuit board 18 with UV-LEDs 17 as excitation sources is once again arranged on the opposite side of the carrier 12 to the decorative layer 11; in contrast to FIG. 2, in which the UV-LED circuit board 18 bears directly on the carrier 12, the UV-LED circuit board 18 in the example according to FIG. 6 is spaced apart from the carrier 12, however, that is to say that the excitation sources are arranged at a distance from the carrier 12. In this case, the illustration is purely schematic; by way of example, suitable holding devices for fixing the UV-LED circuit board 18 to the rest of the molded part 10 are not illustrated.

The arrangements and embodiment of the luminescent material (as layer 14 or integrated or incorporated 15 into the carrier) and of the excitation sources 16, 17, 18, 19 that are contained in the various embodiment variants can be combined with one another as desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

List of Reference Symbols

10 Molded part
11 Decorative layer
12 Carrier
13 Fixing element
14 Luminescent layer
15 Luminescent material integrated or incorporated into the carrier 12
16 UV-LED strip
17 UV-LED, excitation source
18 UV-LED circuit board
19 UV light source, excitation source
20 Optical waveguide
21 Cutouts

We claim:

1. A molded trim part for a vehicle interior, comprising:
at least one excitation source for emitting electromagnetic waves;
at least one carrier layer;
at least one luminescent material incorporated or integrated into the carrier layer, the at least one luminescent material being excitable or excited by the electromagnetic waves emitted from the at least one excitation source to emit light in the visible range;
one or more dyes incorporated or integrated in the carrier layer which impart a specific hue to the light that is emitted by the luminescent material in the visible range; and
at least one decorative layer coupled to the carrier layer;
wherein the at least one excitation source is connected to a voltage source of the vehicle via an on-board electrical system of the vehicle.

2. The molded trim part as claimed in claim 1, wherein the luminescent material is a fluorescent material.

3. The molded trim part as claimed in claim 1, wherein the luminescent material includes luminescent minerals or luminescent dyes.

4. The molded trim part as claimed in claim 1, wherein the electromagnetic waves emitted from the excitation source are a UV radiation in the non-visible range.

5. The molded trim part as claimed in claim 1, wherein the excitation source is a UV light source.

6. The molded trim part as claimed in claim 1, wherein the at least one excitation source is arranged in the carrier layer.

7. The molded trim part as claimed in claim 1, wherein:
at least one section of the carrier layer is at least partly transparent or translucent to the exciting waves emitting from the at least one excitation source.

8. The molded trim part as claimed in claim 1, wherein the decorative layer comprises one or more of the following:
a wood veneer;
a metal sheet;
a plastic or metal film;
a textile sheet; or
a fabric.

9. The molded trim part as claimed in claim 1, wherein the at least one excitation source is electrically connected to a control device for electrically driving the excitation source.

10. The molded trim part as claimed in claim 1, wherein the luminescent material is a phosphorescent material.

11. The molded trim part as claimed in claim 1, wherein the one or more dyes included in the carrier layer are directly integrated into the carrier layer by mixing or blending the dye with material forming the carrier layer.

12. The molded trim part as claimed in claim 5, wherein the UV light source is one or more of the following: a UV lamp, a UV LED strip, or a UV electroluminescent film.

13. The molded trim part as claimed in claim 1, wherein the at least one excitation source is arranged at a distance from the carrier layer.

14. The molded trim part as claimed in claim 1, wherein the luminescent material is integrated into the carrier layer by mixing or blending the luminescent material with the material forming the carrier layer during the formation of the carrier layer.

15. The molded trim part as claimed in claim 1, wherein at least one section of the carrier layer is at least partly transparent or translucent for the light that is emitted by the luminescent material.

* * * * *